United States Patent [19]
Titmas

[11] Patent Number: 4,792,408
[45] Date of Patent: Dec. 20, 1988

[54] METHOD AND APPARATUS FOR ENHANCING CHEMICAL REACTIONS AT SUPERCRITICAL CONDITIONS

[75] Inventor: James A. Titmas, Kent, Ohio

[73] Assignee: James A. Titmas Associates Incorporated, Akron, Ohio

[21] Appl. No.: 37,622

[22] Filed: Apr. 13, 1987

[51] Int. Cl.[4] .................... C02F 1/02; C02F 1/72; B01D 23/00; B01D 29/00

[52] U.S. Cl. .................... 210/747; 166/57; 166/302; 210/170; 210/187; 210/195.1; 210/205; 210/220; 210/761; 210/765; 210/766; 210/774; 210/802; 210/805; 210/808; 261/123; 422/198; 422/200; 422/224; 422/242

[58] Field of Search ............... 203/11; 166/244.1, 300, 166/302, 305.1, 369, 57, 61; 422/129, 138, 198, 200, 224, 242; 210/170, 175, 187, 195.1, 220, 205, 747, 742, 758, 761, 766, 787, 512.1, 774, 779, 802, 804, 805, 808, 741, 765; 261/121.1, 123

[56] References Cited

U.S. PATENT DOCUMENTS

| | | | |
|---|---|---|---|
| 3,449,247 | 6/1969 | Bauer | 210/761 X |
| 3,464,885 | 9/1969 | Land et al. | 166/61 X |
| 3,606,999 | 9/1971 | Lawless | 210/761 X |
| 3,853,759 | 12/1974 | Titmas | 210/761 X |
| 4,272,383 | 6/1981 | McGrew | 210/761 X |
| 4,338,199 | 7/1982 | Modell | 210/761 X |
| 4,564,458 | 1/1986 | Burleson | 210/761 X |
| 4,594,164 | 6/1986 | Titmas | 210/741 |
| 4,683,063 | 7/1987 | Rice | 210/634 |

Primary Examiner—W. Gary Jones
Attorney, Agent, or Firm—Renner, Kenner, Greive, Bobak, Taylor & Weber

[57] ABSTRACT

A continuously flowing fluid is processed by being fed to the top of a hydraulic downdraft column (17) which is of a height such that the pressure at the bottom thereof will approximately be at the pressure necessary to create supercritical water conditions. The fluid is conducted to the bottom of the column (17) and received in a reaction chamber (21) in which the majority of the fluid is recirculated around an annular baffle plate (24). The material in the reaction chamber (21) is heated to a temperature above that necessary to create supercritical water conditions by an independent reaction taking place in a heating chamber (32). The result is that the fluid will undergo chemical reactions at the supercritical temperature and pressure range and will be of a lower specific gravity than the unprocessed fluid. The material not being recirculated in the chamber (21) is fed to one of two updraft columns (30, 31), a start-up column (30) used to preheat the material in the downdraft column (17) during initiation of the process, and a second column (31) isolated from the downdraft column (17) so as not to transmit any heat thereto during normal operation of the process. The temperature of the fluid in the downdraft column (17) is thereby controlled to prevent decomposition of the material until the fluid enters the reaction chamber (21) at which time it is abruptly brought up to the supercritical water temperature.

33 Claims, 2 Drawing Sheets

METHOD AND APPARATUS FOR ENHANCING CHEMICAL REACTIONS AT SUPERCRITICAL CONDITIONS

TECHNICAL FIELD

This invention relates to a method and apparatus which controls chemical processes such as simultaneous oxidation-reduction reactions created within the appropriate ranges of supercritical water temperature and pressure conditions. More particularly, this invention enhances the efficiency of the desired reactions by avoiding detrimental extensive preheating of the materials and by recirculating the materials in a reaction chamber in a deep shaft hydraulic column device.

BACKGROUND ART

It has long been known that an increase in the speed and efficiency of many chemical reactions can be induced by subjecting the substances involved to greatly increased pressure and temperature conditions. At one time it was popular to develop the desired conditions by utilizing autoclaves to confine a batch of the material to be treated which, when heated, gave off vapors and pressurized the container. Alternatively, tanks were pressurized with pump while being heated.

Because of the lack of capacity due to the batch nature of the autoclave process, and because of the mechanical maintenance problems inherent in the use of specialized pumps and outlet throttling devices, the autoclave and pumped pressure tanks are being replaced by the art of using a hydraulic column to develop the desired pressure. The teachings in this art are typified by Bauer (U.S. Pat. No. 3,449,247), Lawless (U.S. Pat. No. 3,606,999), McGrew (U.S. Pat. No. 4,272,383), Burleson (U.S. Pat. No. 4,564,458) and Titmas (U.S. Pat. No. 4,594,164). All of these practice the use of a gaseous oxidant, such as air or oxygen, to heat the process by the destruction of the materials in a water based media.

Although the hydraulic column art eliminates the capacity problems of the autoclave and solves the additional autoclave problems of pressurizing and depressurizing, this art is plagued by the loss of desired materials inherent in the use of oxidation of the product stream to induce heat, and by the accumulation of partly decomposed debris on the annulus walls. Furthermore, only Burleson U.S. Pat. No. 4,564,458 and Titmas U.S. Pat. No. 4,594,164 teach the advantages of operation at supercritical water temperature and pressure conditions. But such conditions only magnify the aforementioned problems which are not addressed by these supercritical patents.

Other hydraulic column heat/pressure methods, such as Land et al. (U.S. Pat. No. 3,464,885) and Titmas (U.S. Pat. No. 3,853,759), do not utilize the oxidation of the product stream to induce heat. Both teach the use of steam to provide heat which is not practical in the supercritical range as the condensation of steam at the supercritical point or above transfers no heat to the process as there is no difference in heat content between steam and condensate under those conditions.

All of these one pass hydraulic column methods require that the downdraft stream be continually heated as it approaches the reaction chamber. But it is this preheating requirement which causes the problem of premature decomposition of the material and resultant accumulation of such material on the passage walls. Such problems are magnified when operating at the supercritical water temperature and pressure range because of the greater extent of the hydraulic column. No one has addressed the need to restrain the rate of heat rise in the downdraft column to avoid these problems, and then abruptly raise the temperature of the stream to the desired temperature.

The only art of which I am aware that has the capability to approach the required effect in the supercritical range is Modell (U.S. Pat. No. 4,338,199). The Modell patent does not teach the use of a hydraulic column to effect the necessary pressure but rather uses pumps to induce all the pressure in an above ground vessel and is thus plagued with the same problems as the autoclave. Furthermore, the excessive and inefficient energy demand required by the pumping process is not suitable for large volumes of fluid with particles of abrasive materials in suspension. In addition, Modell does not teach any suitable means to remove the various mixed material streams from the reaction chamber.

DISCLOSURE OF THE INVENTION

It is thus a primary object of the present invention to provide a method and apparatus for processing materials at supercritical water conditions of temperature and pressure with the downdraft material being isolated from sources of heat to retard reaction kinetics until the fluids to be processed are abruptly introduced to supercritical conditions.

It is another object of the present invention to provide a method and apparatus, as above, which recirculates fluids at the supercritical condition to abruptly heat the downdraft material and to improve the yield by increased reaction duration time.

It is a further object of the present invention to provide a method and apparatus, as above, to provide a heat source independent of the material stream so as to isolate the stream from the products of combustion and to provide independent control of the source of heat.

It is an additional object of the present invention to provide a method and apparatus, as above, which allows the combustion heat operations to proceed at much lower pressures and at much higher temperatures than the process stream.

These and other objects of the present invention, which will become apparent from the description to follow, are accomplished by the improvements hereinafter described and claimed.

In general, the method and apparatus for continuously processing fluid materials includes a vertical passageway receiving the fluid material to be processed and being of a height such that the pressure at the bottom thereof will be approximately at the pressure necessary to create supercritical water conditions. A reaction chamber near the bottom of the vertical passageway receives the fluid therefrom and is heated to a temperature above the temperature necessary to create supercritical water conditions by an independent heating reaction chamber. The combined heat and pressure conditions cause a chemical reaction to take place in the reaction chamber resulting in a processed fluid of lower specific gravity.

The majority of the processed fluid is recirculated in the reaction chamber with the remainder being fed to one of two hydraulic updraft columns. During start-up conditions, the fluid in the vertical passageway needs to be heated and therefore the unrecirculated processed fluid is allowed to rise in an updraft column adjacent to the vertical passageway to heat the fluid therein. After startup, the fluid in the vertical passageway is isolated from the heat of the unrecirculated processed fluid by permitting that fluid to rise in a second updraft column remote from the vertical passageway. In this manner, the temperature of the fluid in the vertical passageway is controlled to prevent premature decomposition thereof with the chemical reactions being retarded until the fluid enters the reaction chamber where the temperature thereof is abruptly brought into the supercritical range by contact with the recirculating fluid therein.

PREFERRED EMBODIMENT FOR CARRYING OUT THE INVENTION

Figure 1:
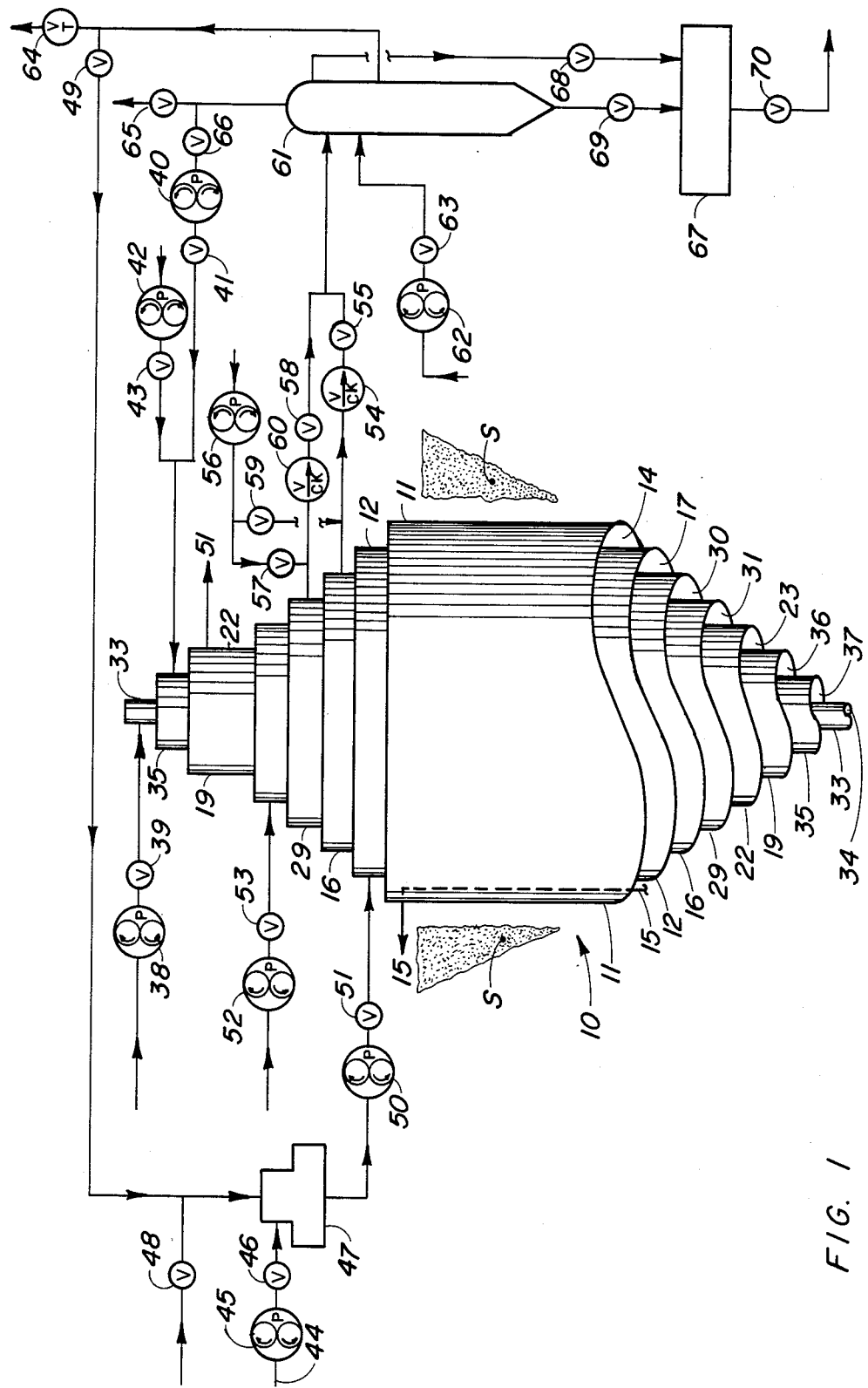
FIG. 1 is a schematic diagram of the top portion of a hydraulic column deep process apparatus according to the concept of the present invention.
Figure 2:
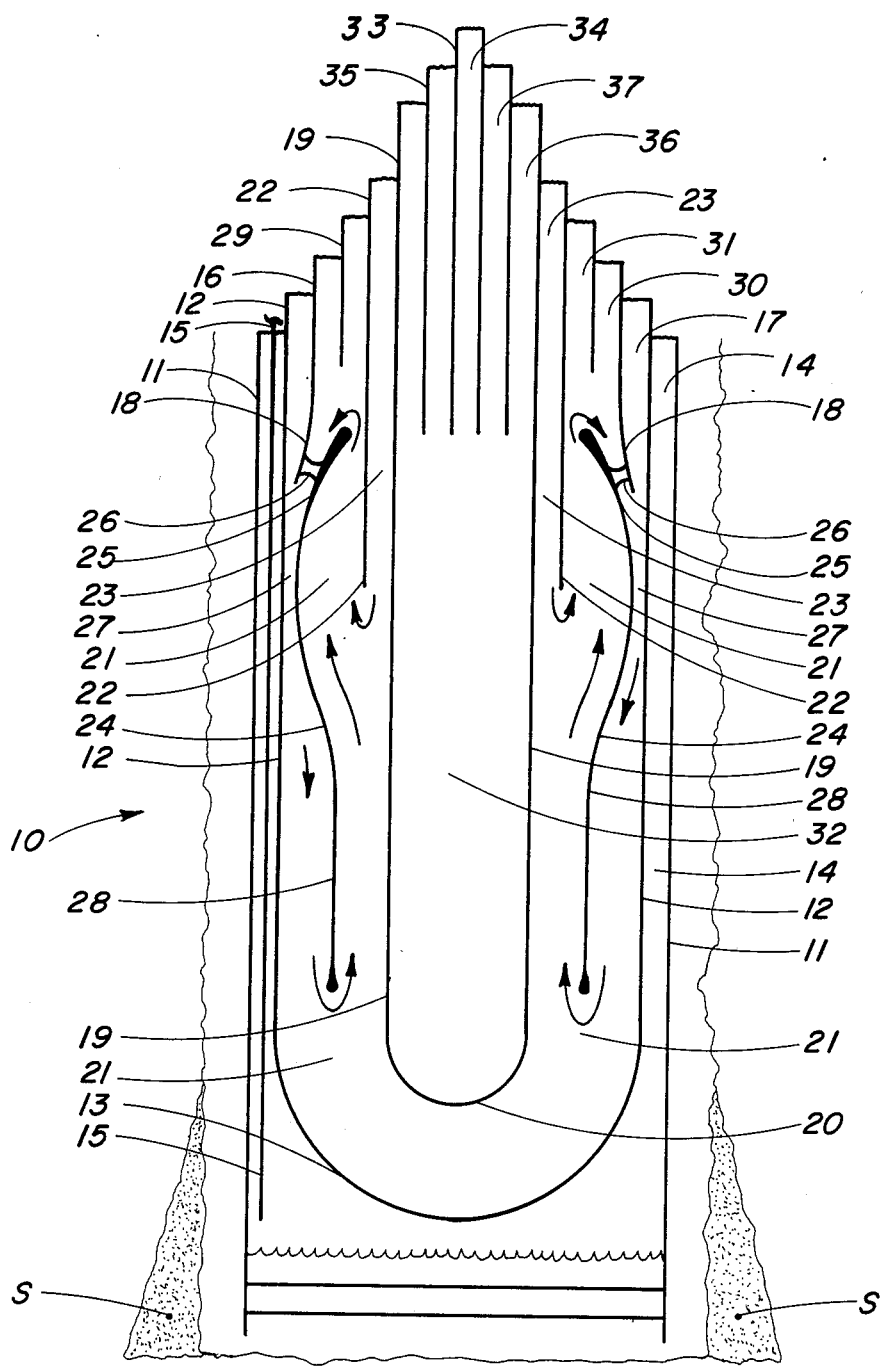
FIG. 2 is a schematic diagram of the bottom portion of the hydraulic column deep process apparatus shown in FIG. 1.

The apparatus for conducting chemical reactions at any specific desired combination of temperature and pressure, such as supercritical water or similar conditions of other fluids, is shown in the form of a hydraulic column and indicated generally by the numeral 10, the top portion of which is shown in FIG. 1 and the bottom portion of which is shown in FIG. 2. An outer casing 11 is spaced from the strata "S" in a bore in the earth. Casing 11 can be separated from the strata with a grout (not shown) to control the intermixing of fluids which may be present in the strata, to reduce the heat losses from the apparatus, and to protect casing 11 from adverse corrosive effects of the strata.

Concentric within and spaced from casing 11 is the outer reactor casing 12 which is closed at its lower end (FIG. 2), as at 13. The space between casings 11 and 12 forms an isolating annulus 14 which acts as a mutual barrier to protect the strata from the process and to protect the process from the strata. Thus, annulus 14 provides isolation of the process from the strata, which isolation may be accomplished, for example, by evacuating annulus 14 or filling annulus 14 with a non-reactive gas under significant pressure.

It is important that annulus 14 be kept dry, that is, free of extraneous liquid which could seep into annulus 14. To that end, if annulus 14 is pressurized, a drop tube 15 can be provided which allows water accumulating in the annulus to pass to the surface and be discharged. By maintaining annulus 14 dry, the annulus space may also be readily used for fixing or movable probes which can survey and monitor the pressure, temperature and stress conditions of the deep process apparatus, as may be desired.

Concentric within and spaced from the outer reactor casing 12 is a pipe 16. The primary fluid to be processed is caused to descend to a zone of higher pressure in an annulus 17 formed between casing 12 and pipe 16. This pressure results from the cumulative weight of the fluid and residual pressures from fluid handling pumps. The bottom of pipe 16 is modified with an outward flare 18 to constrict the downward movement of fluid in annulus 17 for reasons to be hereinafter described.

Concentric within casing 12 and pipe 16 and generally centrally of hydraulic column 10 is a pipe 19 which extends essentially the entire length of hydraulic column 10 and is closed at its lower end, as at 20. The outside of pipe 19 and the inside of casing 12 define, at the bottom of column 10, a recirculating reaction chamber 21 for the material being treated. Concentric around pipe 19 is a casing 22 which extends down into chamber 21 and terminates somewhat medially of the height thereof. The annulus 23 formed between casing 22 and pipe 19 can be used to introduce a secondary reactant fluid, such as oxygen, into recirculating reaction chamber 21, the purpose of which will be hereinafter described.

A recirculation enhancing annular baffle plate, indicated generally by the numeral 24 in FIG. 2, is suspended in reaction chamber 21 as by being attached, at its upper end 25, to the inner portion of the outward flare 18 of pipe 16 by a plurality of vanes 26. The upper end 25 of baffle plate 24 is thereby positioned approximately medially between the inner surface of pipe 16 and the outer surface of casing 22 near the top of reaction chamber 21.

Baffle plate 24 flares outwardly toward the inside of casing 12 to form therewith a venturi annulus 27 generally below the outward flare 18 of pipe 16. From that point baffle plate 24 curves back inwardly toward pipe 19 and extends further downwardly into reaction chamber 21 terminating as a straight annular portion 28 generally medially of casing 12 and pipe 19 and above both the bottom 13 of casing 12 and the closed end 20 of pipe 19.

Concentrically positioned between pipe 16 and casing 22 and terminating at the top of reaction chamber 21, that is, just above upper end 25 of baffle plate 24, is an annular casing 29. Casing 29 thereby forms two updraft annuli for the return of treated material to the surface. As will hereinafter be described in detail, updraft annulus 30 formed between casings 16 and 29 is used during start-up operations and updraft annulus 31 formed between casings 22 and 29 is used after start-up operations are completed.

The internal area of pipe 19 constitutes a low pressure, high temperature, process heating reaction chamber 32 at the bottom of hydraulic column 10. A central pipe 33, defining a central oxygen feed annulus 34, extends downwardly into heating reaction chamber 32. Similarly, another pipe 35, concentrically positioned between central pipe 33 and pipe 19, defines an exhaust annulus 36 between pipe 19 and pipe 35 and combustant annulus 37 between pipe 33 and pipe 35.

In order to create the necessary heat for the process within chamber 32, oxygen is fed via pump 38 and valve 39 (FIG. 1) to the top of annulus 34 of pipe 33 and then down to the low pressure (100 psi) chamber 32. Also, as will hereinafter be described in more detail, process waste gases may be conveniently utilized as a reactant by transmitting the same via pump 40 through valve 41 to annulus 37. Similarly, the flow to annulus 37 may be augmented by transmitting other gaseous fuels by pump 42 through valve 43 to commingle with the waste gases transmitted by pump 40.

The mixture of oxygen in annulus 34 and the fuels in annulus 37 ignites on contact in chamber 32 and can provide the process with a controlled high temperature (2000° F.) heat source within chamber 32. The reactants of this combustion within chamber 32 are transferred up exhaust annulus 36 and thus no contaminants of the combustion process come into contact with the material being treated in recirculation chamber 21.

The fluid material to be processed is introduced through line 44 and transferred by pump 45 at a controlled rate through valve 46 to hydraulic column 10. While the fluid may be directly introduced to annulus 17 of hydraulic column 10, it may be necessary to precondition the material at a preconditioning station such as deaeration vessel 47. As is well known in the art, such conditioning could include the removal of significant oxygen as by bacterial action or as by low pressure steam deaeration provided through valve 48. As will hereinafter be described in more detail, a steam by-product of the process can be efficiently utilized and provided through valve 49 for the deaeration process.

The fluid material to be processed can then be transferred from vessel 47 via pump 50 through valve 51 at a controlled rate to annulus 17 and flows downwardly several thousand feet, at least to a depth necessary to create sufficient pressure to be at or above the supercritical range of water, that is, approximately 3205 psi. At the bottom of pipe 16 the outward flare 18 thereof acts in conjunction with the wall of casing 12 to form a nozzle effect greatly accelerating the fluid in annulus 17 and jetting it into venturi annulus 27 formed between casing 12 and baffle plate 24, as previously described. As is well known to one skilled in the art, this configuration forms an eductor in which the pressure gradient of the fluid stream is reduced due to the well known effects of increased velocity and conservation of mechanical energy. The kinetic energy created in this zone of reduced pressure draws fluid around the top of baffle plate 24 to assist the recirculation in chamber 21.

The cooler influent material is thus jetted into the recirculating reaction chamber 21 which is heated by the process heating chamber 32 as previously described. Recirculation of the fluid in chamber 21 in the direction of the arrows in FIG. 2 is created by several forces at work in concert. First, of course, is the ejector injection force moving the fluid downwardly between casing 12 and annular portion 28 of baffle plate 24. In this area, the fluid is heated by the warmer fluid in chamber 32 causing convection displacement and an updraft effect around the bottom of baffle plate 24. Recirculation is further enhanced by the introduction of a secondary reactant fluid, usually in the form of a fluid less dense that the influent material, such as oxygen, through annulus 23, as previously described. This fluid is introduced to annulus 23 via pump 52 and control valve 53 (FIG. 1), and is introduced into recirculation chamber 21 approximately midway of the height of baffle plate 24 to enhance recirculation in the manner of an air lift pump.

As the air lift assisted fluid travels upwardly between casing 22 and baffle plate 24, a portion of it is admitted to either updraft annulus 30 or 31 with the majority being drawn around the top of plate 24 and through vanes 26 by the nozzle/eductor effect previously described to complete the recirculation process in chamber 21 in the direction of the arrows in FIG. 2. Thus, a large mass of fluid, maintained at a temperature in excess of the supercritical temperature of water, that is, above approximately 706° F., is continually being recirculated in chamber 21 and is continually mixing with a quantity of cooler fresh influent material with an equal quantity being permitted to exit chamber 21 either by entering updraft annulus 30 or by entering annulus 31 for subsequent discharge from the system.

By providing for recirculation of the reaction fluids at supercritical conditions, as just described, the available reaction time is increased. Instead of having one pass through the desired reaction conditions, the majority of the material will travel in the recirculation loop a plurality of times increasing the reaction time by a factor of the ratio of the volume of the recirculation fluid to the entry/exit volume.

One of the primary concepts of the present invention is to avoid preheating of the downdraft influent material so that premature reactions do not take place in annulus 17 with the resultant accumulation of the prematurely decomposed material on the annulus walls. Then, this cooler influent material is abruptly heated by contact with the recirculating material in chamber 21 where the desired chemical reaction is conducted, as just described. However, during start-up conditions heat is at a premium due to normal energy losses to the strata and thus some heating of the downdraft material in annulus 17 is necessary. To this end, during start-up procedures a certain portion of the warmer recirculating fluid in chamber 21 is permitted to leave the system through updraft annulus 30, as controlled by valves 54 and 55 (FIG. 1). The other updraft annulus, annulus 31, is filled with an inert gas of low conductivity, as supplied by pump 56 through valve 57 (FIG. 1), thus forcing the start-up updraft to exit through annulus 30. In this manner much of the heat of the processed updraft fluid in annulus 30 is passed to the start-up fluid in downdraft annulus 17 through the direct counter flow heat exchange through the wall of casing 16.

After start-up conditions are sustained, that is, when the fluid in annulus 17 reaches approximately 400° F., no further preheating is desired in order to avoid the deleterious effects of premature decomposition of the downdraft material. At this point, then, the updraft fluid which had been directed to annulus 30 is redirected to annulus 31 by opening valve 58 and closing valve 55. In addition, valve 57 is closed and valve 59 opened allowing the start-up updraft fluid in annulus 30 to be replaced by the inert retardant gas. Thus, processed fluid now flows through check valve 60 and valve 58 instead of check valve 54 and valve 55. There is thus no longer a significant source of heat in annulus 30 to preheat the downdraft fluid in annulus 17 and in addition, more heat is preserved in the updraft annulus 31 for further processing by surface apparatus now to be described.

Processed fluids emerging from hydraulic column 10 from either annulus 30 or 31 are directed via control valve 55 or 58, respectively, to a separation chamber 61. As is well known in the art, such a chamber provides for the separation of solids and gases from the main fluid stream which is still at a fairly high pressure because of the differential densities of the influent and effluent hydraulic columns. The solids in the stream settle to the bottom of chamber 61 and the insoluable and uncondensed gases rise to the top. If necessary, the separation of the materials may be facilitated by altering the pH condition thereof by introducing chemicals via pump 62 through control valve 63. The main fluid stream is thus allowed to drop in pressure and exit chamber 61 through valve 64 for collection, further processing, or destruction, as may be desired. A portion of the high pressure fluid may be allowed to pass via valve 49, as previously described, to assist in the preconditioning of the influent material in deaeration vessel 47.

The gases at the top of chamber 61 may be removed through outlet control valve 65. Certain hydrocarbons collected in chamber 61 may be selectively directed, as previously described, to annulus 37, to be used as fuel to assist in generating the heat in chamber 32, by opening valve 66 whereby pump 40 can direct the fuel through valve 41 and to annulus 37.

Because of the high pressure within chamber 61, release of the solids therefrom is accomplished on a batch basis utilizing a conventional pressure lock chamber 67 which is first pressurized with gases from chamber 61 by opening valve 68. When chamber 61 and pressure lock chamber 67 are nearly equalized in pressure, valve 69 is opened to allow accumulated solids to pass from chamber 61 to pressure lock chamber 67. When the solids inventory in chamber 61 is reduced, valves 68 and 69 are closed and pressure lock chamber 67 is slowly reduced in pressure until solids can be removed at safe pressure by opening valve 70. Thereafter valve 70 is closed and the process may be repeated.

Further details of the pretreatment and post-treatment of a fluid or product, and other technical considerations such as materials of construction, corrosion and erosion control, cleaning, catalysts, cathodic protection, seals, water hammer control, automating devices, thermal expansion and contraction, separation of insoluable salts, stress-strain control and many others, would all be known to one skilled in the art and are not described herein.

It should thus be evident that the method and apparatus disclosed herein is capable of controlling the temperature of the influent downdraft material by heating the same during start-up due to the heat exchange from the material in the adjacent start-up effluent column, and thereafter discontinuing such heat supply by isolating the downdraft material from the updraft material. Premature decomposition of the downdraft material and the concomitant accumulation of the same on the annulus walls is thereby avoided. The temperature-controlled downdraft material is then exposed to the fluid in the recirculating reaction chamber and abruptly heated to supercritical water temperature and pressure conditions to create desired chemical reactions at those conditions as is well known to one skilled in the art. The recirculating fluid reaction chamber not only provides the heat sink necessary to abruptly raise the temperature of the downdraft material, but it also permits the materials to be exposed to the supercritical conditions for a longer period of time than has previously been known in the art. By heating the fluid recirculating reaction chamber through an independent heat source, isolated from the reaction chamber, start-up and restart are more efficient and practical, and in addition, the processed material in the effluent stream is not affected by the products of the combustion providing the heat. As such, the objects of the present invention are fully accomplished and the deep well fluid processing art substantially improved.

I claim:

1. A method of processing a continuously flowing fluid material comprising the steps of feeding the fluid to the top of a hydraulic downdraft column; conducting the fluid from the bottom of the hydraulic downdraft column into a reaction chamber; maintaining the pressure in the reaction chamber at approximately the pressure necessary to create supercritical water conditions; heating the fluid in the reaction chamber to maintain the temperature of the fluid above the temperature necessary to create supercritical water conditions; said heat and pressure causing a chemical reaction to take place in the reaction chamber resulting in a processed fluid of lower specific gravity; recirculating a portion of the processed fluid in the reaction chamber; conducting the remainder of the processed fluid to the bottom of a hydraulic updraft column whereby the pressure at the bottom of the updraft column causes the remainder of the processed fluid to rise therein; and removing the remainder of the processed fluid from the top of the updraft column.

2. A method according to claim 1 further comprising the step of controlling the temperature of the fluid in the downdraft column so that it is abruptly heated by the fluid recirculating in the reaction chamber.

3. A method according to claim 1 wherein the step of heating the fluid in the reaction chamber is performed by providing heat in an independent chamber adjacent to the reaction chamber, the heat being transferred to the reaction chamber assisting said step of recirculating the fluid.

4. A method according to claim 3 wherein the step of providing heat is accomplished by oxidizing a fuel in the independent chamber.

5. A method according to claim 4 further comprising the step of augmenting the fuel with waste gases from the process.

6. A method according to claim 1 wherein the step of conducting the fluid from the bottom of the hydraulic downdraft column includes the step of educting the fluid to the reaction chamber thereby assisting the recirculation of fluid in the reaction chamber.

7. A method according to claim 1 further comprising the step of injecting a gas into the reaction chamber to assist the recirculation of fluid in the reaction chamber.

8. A method of processing a continuously flowing fluid material comprising the steps of feeding the fluid to the top of a hydraulic downdraft column; conducting the fluid from the bottom of the hydraulic downdraft column into a reaction chamber; maintaining the pressure in the reaction chamber at approximately the pressure necessary to create supercritical water conditions; heating the fluid in the reaction chamber to maintain the temperature of the fluid above the temperature necessary to create supercritical water conditions; said heat and pressure causing a chemical reaction to take place in the reaction chamber resulting in a processed fluid of lower specific gravity; recirculating a portion of the processed fluid in the reaction chamber; conducting the remainder of the processed fluid to the bottom of a hydraulic updraft column whereby the pressure at the bottom of the updraft column causes the remainder of the processed fluid to rise therein; transferring heat from the updraft column to the downdraft column during initial phases of operation of the process; thermally isolating the downdraft column from the updraft column during subsequent operation of the process; and removing the remainder of the processed fluid from the top of the updraft column.

9. A method of processing a continuously flowing fluid material comprising the steps of feeding the fluid to the top of a hydraulic downdraft column; controlling the temperature of the fluid in the downdraft column so as not to exceed a predetermined temperature lower than the temperature necessary to create supercritical water conditions by selectively exposing the downdraft column to the heat in the updraft column so as to raise the temperature of the fluid in the downdraft column toward the predetermined temperature and alternatively insulating the downdraft column from the heat in the updraft column; conducting the fluid from the bottom of the hydraulic downdraft column into a reaction chamber; maintaining the pressure in the reaction chamber at approximately the pressure necessary to create supercritical water conditions; heating the fluid in the reaction chamber to maintain the temperature of the fluid above the temperature necessary to create supercritical water conditions so that the fluid in the downdraft column is abruptly heated from below the predetermined temperature to the temperature necessary to create supercritical conditions when conducted to the reaction chamber; said heat and pressure causing a chemical reaction to take place in the reaction chamber resulting in a processed fluid of lower specific gravity; conducting the processed fluid to the bottom of a hydraulic updraft column whereby the pressure at the bottom of the updraft column causes the processed fluid to rise therein; and removing the processed fluid from the top of the updraft column.

10. A method according to claim 9 wherein the step of heating the fluid in the reaction chamber is accomplished independently of the heat of the reaction from a source adjacent to the reaction chamber.

11. A method according to claim 9 further comprising the step of recirculating the fluid in the reaction chamber.

12. A method according to claim 11 wherein approximately the same amount of fluid is conducted to the reaction chamber from the downdraft column as is conducted to the updraft column from the reaction chamber to maintain a relatively constant volume of fluid recirculating in the reaction chamber.

13. Apparatus for processing a continuously flowing fluid stream comprising first vertical passageway means receiving the fluid stream near the top thereof and being of such a height such that the pressure at the bottom thereof will be approximately the pressure necessary to create supercritical water conditions; means defining a reaction chamber near the bottom of said first vertical passageway means and receiving the fluid stream therefrom; means defining a heating reaction chamber adjacent said means defining a reaction chamber to heat the fluid in said means defining a reaction chamber to a temperature above the temperature necessary to create supercritical water conditions; said temperature and pressure causing a chemical reaction to take place in said means defining a reaction chamber resulting in a processed fluid of lower specific gravity; means to recirculate a majority of the processed fluid in said means defining a reaction chamber, and second vertical passageway means communicating with said means defining a reaction chamber to receive a minority of the processed fluids in said means defining a reaction chamber whereby the processed fluid in said second vertical passageway means flows upwardly to the top thereof.

14. Apparatus according to claim 13 wherein said second vertical passageway means is adjacent said first vertical passageway means so that heat from the fluid in said second vertical passageway means heats the fluid stream in said first vertical passageway means.

15. Apparatus according to claim 13 wherein said second vertical passageway means is remote from said first vertical passageway means so that minimal heat is transmitted from the fluid in said second vertical passageway means to the fluid stream in said first vertical passageway means.

16. Apparatus according to claim 13 further comprising means to maintain a relatively constant volume of processed fluid being recirculated in said means defining a reaction chamber so that the amount of the fluid stream received by said means defining a reaction chamber from said first vertical passageway means is approximately equal to said minority of the processed fluids being received by said second vertical passageway means.

17. Apparatus according to claim 13 further comprising third vertical passageway means extending into said means defining a heating reaction chamber and fourth vertical passageway means extending into said means defining a heating reaction chamber.

18. Apparatus according to claim 17 further comprising means to supply oxygen to said means defining a heating reaction chamber through said third vertical passageway and means to supply gaseous fuels to said means defining a heating reaction chamber through said fourth vertical passageway.

19. Apparatus according to claim 18 further comprising means to augment the gaseous fuels in said fourth vertical passageway with waste gaseous fuels contained in the fluid received at the top of said second vertical passageway.

20. Apparatus according to claim 13 wherein said means defining a reaction chamber has an inner wall adjacent said means defining a heating reaction chamber and an outer wall remote therefrom, said means to recirculate including a baffle plate within said means defining a reaction chamber and extending longitudinally between said inner and outer walls thereof.

21. Apparatus according to claim 20 wherein said first vertical passageway means is restricted at its lower end to form a nozzle to jet the fluid stream into the space between said baffle plate and said outer wall of said means defining a reaction chamber.

22. Apparatus according to claim 21 wherein said baffle plate flares outwardly toward said outer wall of said means defining a reaction chamber at a point below the bottom of said first vertical passageway to form an eductor for the fluid stream being received between the outward flare of said baffle plate and said outer wall of said means defining a reaction chamber.

23. Apparatus according to claim 22 wherein said means to recirculate further includes third vertical passageway means terminating at its lower end between said baffle plate and said inner wall of said means defining a reaction chamber, and means to introduce a secondary reactant fluid into said means defining a reaction chamber through said third vertical passageway means to provide an air lift to assist recirculation of the processed fluid in said means defining a reaction chamber.

24. Apparatus for processing a continuously flowing fluid stream comprising first vertical passageway means receiving the fluid stream near the top thereof and being of such a height such that the pressure at the bottom thereof will be approximately the pressure necessary to create supercritical water conditions; means defining a reaction chamber near the bottom of said first vertical passageway means and receiving the fluid stream therefrom; means defining a heating reaction chamber adjacent said means defining a reaction chamber to heat the fluid in said means defining a reaction chamber to a temperature above the temperature necessary to create supercritical water conditions; said temperature and pressure causing a chemical reaction to take place in said means defining a reaction chamber resulting in a processed fluid of lower specific gravity; means to recirculate a majority of the processed fluid in said means defining a reaction chamber, second vertical passageway means communicating with said means defining a reaction chamber to receive a minority of the processed fluids in said means defining a reaction chamber; said second vertical passageway means including a first vertical annulus adjacent said first vertical passageway means and a second vertical annulus adjacent said first vertical annulus and remote from said first vertical passageway means; and means to selectively permit said minority of the processed fluids being recirculated in said means defining a reaction chamber to be transferred to said first vertical annulus or said second vertical annulus whereby the processed fluid in said first vertical annulus or said second vertical annulus flows upwardly to the top thereof.

25. Apparatus according to claim 24 wherein said means to selectively permit includes means to selectively pressurize said first vertical annulus or said second vertical annulus such that when said first vertical annulus is pressurized said minority of the processed fluid being recirculated in said means defining a reaction chamber is received by said second vertical annulus and when said second vertical annulus is pressurized said minority of the processed fluid being recirculated in said means defining a reaction chamber is received by said first vertical annulus.

26. Apparatus for processing a continuously flowing fluid stream comprising first vertical passageway means receiving the fluid stream near the top thereof and being of such a height such that the pressure at the bottom thereof will be approximately the pressure necessary to create supercritical water conditions; means defining a reaction chamber near the bottom of said first vertical passageway means receiving the fluid stream therefrom; means defining a heating reaction chamber adjacent said means defining a reaction chamber to heat the fluid in said means defining a reaction chamber to a temperature above the temperature necessary to create supercritical water conditions; said temperature and pressure causing a chemical reaction to take place in said means defining a reaction chamber resulting in a processed fluid of lower specific gravity; second vertical passageway means communicating with said means defining a reaction chamber and being adjacent said first vertical passageway means; third vertical passageway means communicating with said means defining a reaction chamber and being adjacent said second vertical passageway means and remote from said first vertical passageway means, and means to selectively direct the processed fluid to said second vertical passageway means during initiation of the process and to said third vertical passageway means during normal operation of the process, whereby processed fluid selectively in said second or third passageway means flows upwardly to the top thereof.

27. Apparatus according to claim 26 wherein said means to selectively direct includes means to selectively pressurize said second vertical passageway means and said third vertical passageway means such that when said second vertical passageway means is pressurized, the processed fluid is received by said third vertical passageway means and when said third vertical passageway means is pressurized, the processed fluid is received by said second vertical passageway means.

28. Apparatus according to claim 26 further comprising fourth vertical passageway means extending into said means defining a heating reaction chamber and fifth vertical passageway means extending into said means defining a heating reaction chamber, said means defining a heating reaction chamber receiving combustants from said fourth and fifth vertical passageway means to chemically react to heat said means defining a reaction chamber.

29. Apparatus according to claim 26 wherein said means defining a reaction chamber has an inner wall and an outer wall spaced therefrom, said inner wall being the outer wall of said means defining a heating reaction chamber and providing the only source of external heat to maintain said chemical reaction.

30. Apparatus according to claim 29 further comprising an annular baffle plate in said means defining a reaction chamber extending longitudinally between said inner wall and said outer wall.

31. Apparatus according to claim 30 wherein said first vertical passageway means is restricted at its lower end to cause a jet stream of fluid to be emitted into the space between said baffle plate and said outer wall of said means defining a reaction chamber.

32. Apparatus according to claim 31 wherein said baffle plate flares outwardly toward said outer wall of said means defining a reaction chamber below the point at which the jet stream of fluid is emitted to thereby form an eductor causing the fluid in said means defining a reaction chamber to be recirculated around said baffle plate.

33. Apparatus according to claim 32 further comprising third vertical passageway means terminating at its lower end between said baffle plate and said inner wall of said means defining a reaction chamber, and means to introduce a secondary fluid into said means defining a reaction chamber through said third vertical passageway means to assist the recirculation of the fluid around said baffle plate.

* * * * *